Aug. 6, 1968  W. L. KRAUSE  3,395,461

VISUAL TRAINING AID

Filed March 25, 1966

INVENTOR
WALLY L. KRAUSE

BY Fisher, Christen, Sabol & Caldwell
ATTORNEYS

United States Patent Office 3,395,461
Patented Aug. 6, 1968

3,395,461
VISUAL TRAINING AID
Wally L. Krause, 2118 NE. 143rd,
Portland, Oreg. 97230
Filed Mar. 25, 1966, Ser. No. 537,508
6 Claims. (Cl. 35—6)

ABSTRACT OF THE DISCLOSURE

A portable instructional device for teaching playing of keyboard instruments includes visual indicator means for indicating natural notes whenever a white key is struck and also selector means for alternatively indicating a "sharp" or "flat" notes whenever a black key is struck.

---

This invention relates to educational devices, and more particularly to a portable display device for use in teaching the playing of keyboard musical instruments such as pianos, or the like.

The purpose of the device is to enable one who is playing a keyboard instrument to obtain a visual indication of the keys being struck by his fingers as he plays the instrument. In this connection, an electrically operated display board is provided showing the conventional musical scale upon which the notes are indicated by electric lights. Circuit means is also provided, controlled by switches actuated by individual keys to indicate the notes being played by illuminating the appropriate lights as the respective keys are depressed.

One difficulty with prior devices of this type is the fact that certain half tones on the musical scale may be designated either as "sharp" or "flat" even though they have the same frequency depending on the "key" in which the musical composition has been written. At the same time these notes are written on the musical scale in the same position as they would be if they were "naturals."

Thus, while A sharp and B flat have the same frequency, a half tone between A natural and B natural, they would be written on the scale as either A or B, the only indication of whether they are to be played as a sharp or a flat being given by the designation of the "key" at the beginning of the scale.

It is therefore an object of the present invention, which I call Telstaff, to provide a portable device which may be installed on a keyboard musical instrument for giving the player of the instrument a visual indication of the notes being played and which is adapted for the playing of music written in any key.

Other objects and advantages will be apparent to those skilled in the art after reading the following specification in connection with the annexed drawings, in which.

Figure 1:
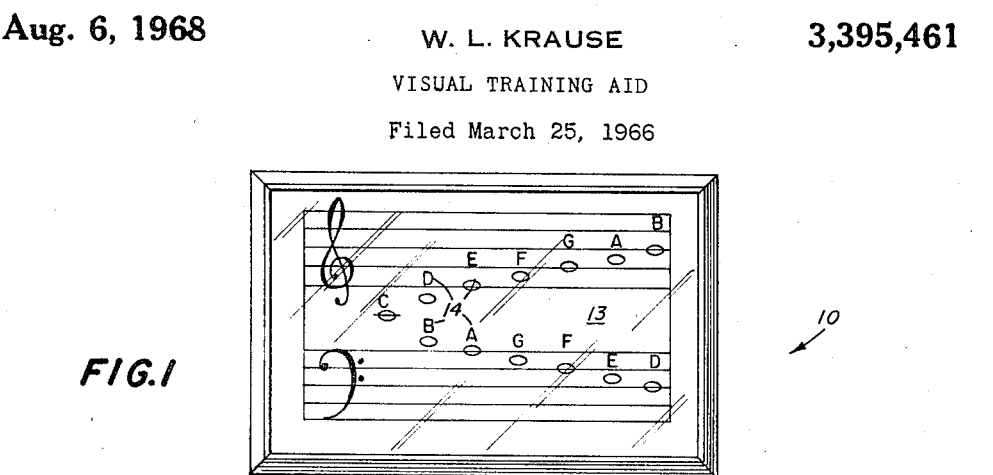
FIGURE 1 is a front elevation of apparatus constructed in accordance with this invention shown in position on the keyboard portion of a piano.

In the drawings, a visual display panel, indicated generally by numeral 10, is connected by a multi-conductor cable, indicated generally by numeral 11, to a switching mechanism, indicated generally by numeral 12. The display panel 10 includes a surface 13 upon which is reproduced a portion of the standard musical scale notation for the base and treble clefs. Also at appropriate positions on the scale there are a series of electrically operated lights 14 positioned to indicate the individual notes. The display panel may be placed on a stand (not shown) on top of the piano or suspended from the wall so as to be visible to the user.

The switching mechanism 12 includes an elongated horizontal supporting member 17 provided with suitable vertical openings at each end for slidably receiving a pair of posts 18, each of which may be provided at its lower end with a suction cup 19 to removably attach the horizontal support above the keyboard of a piano. The vertical position of the support may be adjusted by means of the threaded clamping members 20, the inner ends of which bear against the posts 18.

The portion of the keyboard shown in FIGURE 1, starting at the left, includes the keys for playing the notes "E," "F" and "G" of one octave together with the keys for playing the notes for the following octave namely, "A" through "G." A series of plungers are mounted in the support 17 for free slidable vertical movement. Each of the plungers is positioned so that its lower end rests upon a single key, whether it be a white or a black one. These plungers are numbered from 21 to 36 inclusive, thus, plungers 21, 22, 24, 26, 28, 29, 31, 33, 34 and 36 are positioned to be movable vertically in response to movement of a white key while the plungers 23, 25, 27, 30, 32 and 35 are positioned to be movable in response to movement of a black key.

In order to assure positive actuation of the plungers when a corresponding key is depressed, they may each be provided with a coil spring 37 arranged to urge the plungers in a downward direction. The plungers associated with the black keys, namely plungers 23, 25, 27, 30, 32 and 35 shown in FIGURE 1 are also provided at their upper ends above the support 17 with a forwardly projecting pin which in turn is pivotally connected to a light rod 38 which extends across the entire length of the support.

One end of this rod is also pivotally connected with an actuating lever 39, this lever being pivotally attached to the support by means of the pivotal connection 40. As a result, movement of the lever from right to left will cause partial rotation of each of the plungers connected with the rod 38 for a purpose which will be explained later. In this connection, it should be noted that the rod should be flexible enough so as not to impede the vertical movement of the plungers connected thereto. By means of this arrangement all of the vertically movable plungers for the black keys may also be partially rotated in a clockwise, or counterclockwise direction simultaneously and by the same amount by movement of the lever 39.

Figure 2:
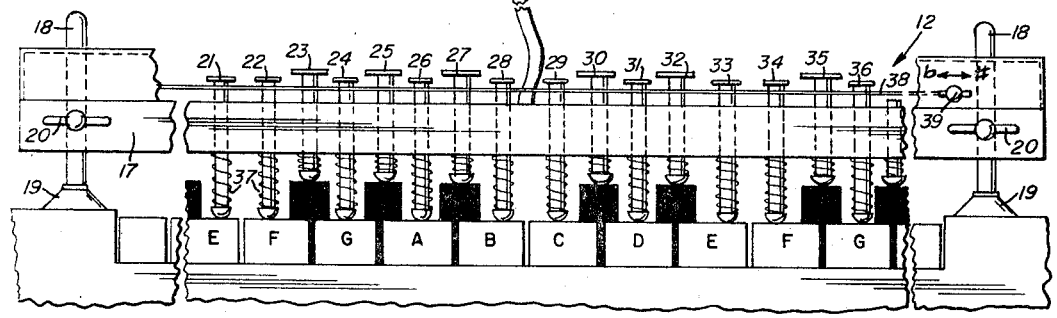
FIGURE 2 is a fragmentary plan view of the invention on an enlarged scale.
Figure 2:
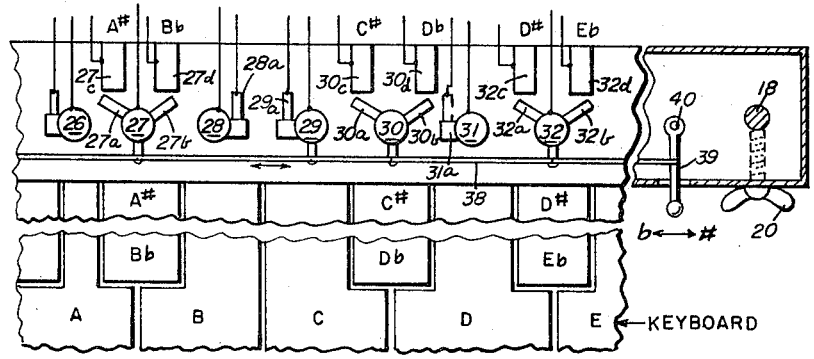

By examining the diagram in FIGURE 2, it will be observed that the plungers for the black keys, namely plungers 27, 30 and 32, are each provided with a pair of radially extending annularly displaced flexible flat spring contact members, as for example 27a, 27b, 30a, 30b, 32a and 32b. Associated with each of the plungers 27, 30 and 32 are also a pair of fixed contacts respectively indicated by numerals 27c, 27d, 30c, 30d, 32c and 32d, these fixed contacts being arranged so that when the lever 39 is in the mid position as shown in the drawing the movable contacts of the plungers for the black keys will not connect with either of the fixed contacts when the respective black key is depressed.

In the case of the white keys, as for example those keys for playing the notes "A" and "B" in a musical scale and which actuate the vertical plungers 26 and 28, it will be noted that each of these plungers is provided only with one radially extending flexible flat leaf contact, indicated by numerals 26a and 28a respectively. Directly below these respective movable contacts are the fixed contacts 26b and 28b respectively.

Since the plungers 26 and 28 are movable vertically but are incapable of rotation, whenever their respective keys are pressed a contact will be made between the respective movable contact and its fixed contact.

In the raised position the elevation of the movable contacts 27a and 27b are slightly above the normal elevation of movable contacts 26a of plunger 26 and movable contact 28a of plunger 28.

Thus it will be seen that when the plunger 27 is partially rotated in a counterclockwise direction, the movable contact 27a will engage contact 26a and the movable contact 27b will engage with contact 28a whenever the plunger 27 is depressed. Also, if the plunger 27 is partially rotated in a clockwise direction, contacts 27a and 27b will engage respectively with fixed contacts 27c and 28b when the plunger 27 is depressed.

All of the fixed contacts are connected by a common lead wire to one side of a source of electricity, such as a plug 41, the other side of the plug being connected for a common wire with one side of each of the indicator lights 14. On the other hand, each of the indicator lights has its other side connected with a different one of the movable plungers actuated by the white keys as shown in FIGURE 2, the light for the note "A" is connected with plunger 26, the light for the note "B" is connected with plunger 28, light for the note "C" is connected with plunger 29 and plunger 31 is connected with the light for the note "D."

Thus, regardless of the position of the plungers for the black keys, whenever one of the white keys is depressed thus pressing the associated switch plunger the corresponding indicator light 14 for that particular note will always be actuated. On the other hand, when the plungers for the black keys are in their middle position as shown in FIGURE 2, no circuit will be established and none of the indicator lights will be illuminated when a black key is depressed; this is the correct arrangement for use of the apparatus in connection with playing a musical instrument in the key of "C" natural, a key which contains neither sharps nor flats.

Figure 3:
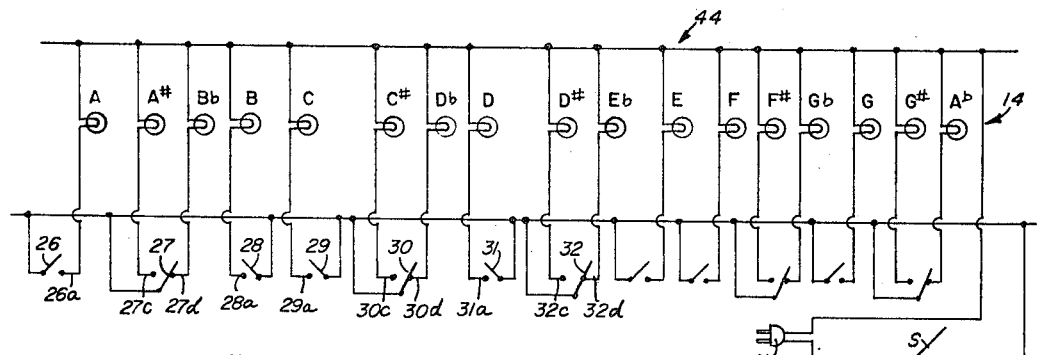
FIGURE 3 is a typical portion of the connections for the electrical circuit.

Referring to FIGURE 3, the circuit is generally indicated by reference numeral 44, which shows the schematic circuitry for one octave of key contacts including the corresponding contacts of FIGURE 2, by way of example of the treble clef. This circuitry may be repeated for each octave of a chromatic scale of notes of a conventional keyboard, such as, a piano or the like.

Each of the notes indicates corresponding lights of the circuit and are designated by the appropriate note of the keyboard as generally represented by reference numeral 14, as shown in FIGURE 1.

Plunger 26 carries a movable contact which intermittently contacts stationary contact 26a to periodically energize light 14 of the circuit designated as note "A" on screen 10 when the key "A" of the keyboard is struck by the finger of the player of same.

Plunger 27 carries two movable contacts 27a and 27b which selectively contacts stationary contacts 27c and 27d respectively, depending on whether the student desires to read the half tones in sharps or flats, by positioning lever 39 in the proper position, as best shown in FIGURE 2. For the sake of clarity in FIGURE 3, the movable contacts 27a and 27b have been omitted and the plunger and these contacts are indicated as one switch 27, which selectively contacts stationary contacts 27c and 27d, respectively as desired through positioning lever 39 and striking the black key connoted in equivalency in half tones as either A# (A sharp) or B♭ (B flat), as desired by one playing the keyboard and sight reading the illuminated notes on the musical scale of the illuminated screen 10 of FIGURE 1.

The contacts of key plungers 28, 29 and 31 for notes "B," "C" and "D," respectively, operate in the same manner as for the note "A" above.

Likewise, for the sake of clarity of the circuit of FIGURE 3, the movable contacts 30a and 30b carried by note operated plunger 30 have been omitted and shown as a single switch for selectively contacting stationary contacts 30c and 30d, respectively of the circuit to illuminate light 14 for either equivalent notes "C" sharp or "D" flat, as desired by the player thereof.

Also, for the sake of clarity the movable contacts 32a and 32b of note operated plunger 32 have been omitted and shown as a single switch for selectively contacting stationary contacts 32c and 32d, as shown in FIGURE 3, for the black key connoting either "D" sharp or "E" flat, as desired by the player on screen 10.

Thus, it is apparent that the circuit switch contacts and operation of same for either the whole tones or the half tones may be repeated for any number of octaves of notes for a keyboard as above illustrated and described for FIGURE 3.

In operation, plug 41 is plugged into a suitable energized electrical outlet (not shown) and then switching mechanism 12 is adjustably stationed above the keyboard and screen 10 is also positioned on top of the piano, or other appropriate place, for viewing by the person playing the piano, organ or the like. Then switch S is closed in the circuit of FIGURE 3. Then the player reads from memory or sheet music to play the piano by striking the keys thereof which operates the plunger switches as shown in FIGURES 1, 2 and 3, which energized lights 14 on screen 10 corresponding to whole tones and sharp or flat half tones, as desired by the operator. In operation, as each key of the keyboard is depressed by the operator the corresponding piston contact falls by gravity or other means to make its electrical contact to energize the corresponding light 14 for the depressed key of the keyboard as illuminated and shown on screen 10.

It is to be understood that the particular embodiment of the invention described herein is presented by way of illustration only, and not by restriction, and that various other arrangements, variations and adaptations may be devised therefor without departing from the true scope of the invention.

What is claimed is:

1. Apparatus for use in teaching the playing of a keyboard musical instrument wherein a first group of keys produce tones represented as "natural" notes on the musical scale, and a second group of keys produce tones represented either as "sharps" or "flats" of the "natural" notes, comprising display means having a representation of the musical scale thereon and including a plurality of electrically energized visual indicators for indicating each of the "natural" notes and each "sharp" and "flat" note at its correct position on the scale, circuit means for said visual indicators including portable switching means to be associated with a keyboard and to be actuated by the depression of the individual keys thereof for energizing a corresponding "natural" note indicator in response to depression of one of said first group of keys, said switching means also including selector means for the second group of keys for alternatively energizing the corresponding "sharp" or "flat" note indicator in response to depression of one of said second group of keys.

2. The invention as defined in claim 1, wherein said switching means includes a normally open switch means for each key of said first group of keys for energizing only a single respective visual indicator means when a key of said first group is depressed.

3. The invention as defined in claim 1, wherein said switching means includes a normally open switch means for each of said second group of keys, each of said switch means having a plurality of conditions, each switch means being actuated by depression of a respective key for energizing one of two specific visual indicators when in one condition and for energizing the other of said two visual indicators when in another condition.

4. The invention as defined in claim 3, wherein said selector means includes means for simultaneously placing all of the switch means for the second group of keys in said one condition; and, alternatively, in said another condition.

5. The invention as defined in claim 4, wherein each of said switch means for the second group of keys has a third condition wherein said switch means remains open when a respective key is depressed, and said selector means also includes means for placing all of said switch in said third condition.

6. The invention as defined in claim 1, wherein said switching means includes a plurality of plungers, means for mounting each of said plungers for vertical movement in response to vertical movement of a respective key of said second group of keys, each of said plungers having a radially directed contact member for electrical engagement with a fixed contact when in a depressed position, said plungers also being mounted for rotation about the axis of vertical movement, and means operatively connected with all of said plungers for rotating said plungers between one position wherein said contact members will engage the respective fixed contact when depressed to close a circuit and another position wherein the contact members are offset angularly to maintain a circuit open when depressed.

References Cited

UNITED STATES PATENTS

| 2,505,608 | 4/1950 | Edwards | 84—470 |
| 2,791,147 | 5/1957 | Meadows | 84—478 |
| 2,814,230 | 11/1957 | Johnston | 84—478 |
| 3,080,661 | 3/1963 | Conrath | 35—6 |

FOREIGN PATENTS 428,005   5/1935   Great Britain.

EUGENE R. CAPOZIO, *Primary Examiner.*

W. W. NIELSEN, *Assistant Examiner.*